United States Patent
Andrews (10) Patent No.: US 12,503,691 B2
(45) Date of Patent: Dec. 23, 2025

(54) AUXOTROPHIC STRAINS OF STAPHYLOCOCCUS BACTERIUM

(71) Applicant: Azitra Inc, Branford, CT (US)

(72) Inventor: Richard Andrews, Farmington, CT (US)

(73) Assignee: Azitra Inc, Branford, CT (US)

( * ) Notice: Subject to any disclaimer, the term of this patent is extended or adjusted under 35 U.S.C. 154(b) by 977 days.

(21) Appl. No.: 17/320,987

(22) Filed: May 14, 2021

(65) Prior Publication Data

US 2021/0269791 A1 Sep. 2, 2021

Related U.S. Application Data

(63) Continuation of application No. PCT/US2019/061439, filed on Nov. 14, 2019.

(60) Provisional application No. 62/768,485, filed on Nov. 16, 2018.

(51) Int. Cl.
| | |
|---|---|
| *C12N 1/20* | (2006.01) |
| *A61K 35/74* | (2015.01) |
| *A61K 39/085* | (2006.01) |
| *C12N 9/10* | (2006.01) |
| *C12N 9/90* | (2006.01) |
| *C12N 15/74* | (2006.01) |
| *C12R 1/45* | (2006.01) |

(52) U.S. Cl.
CPC .............. *C12N 9/90* (2013.01); *A61K 35/74* (2013.01); *C12N 9/1096* (2013.01); *C12N 15/74* (2013.01); *C12Y 206/01021* (2013.01); *C12Y 501/01001* (2013.01)

(58) Field of Classification Search
CPC ........ C12N 9/90; C12N 9/1096; C12N 15/74; C12N 1/205; A61K 35/74; A61K 39/085; C12Y 206/01021; C12Y 501/01001; C12R 2001/45; A61P 35/00; C12Q 1/689
See application file for complete search history.

(56) References Cited

U.S. PATENT DOCUMENTS

| | | |
|---|---|---|
| 2007/0110748 A1 | 5/2007 | Hook et al. |
| 2010/0150956 A1 | 6/2010 | Patti et al. |
| 2016/0235834 A1 | 8/2016 | Bou Arevalo et al. |

FOREIGN PATENT DOCUMENTS

| | | |
|---|---|---|
| ES | 2586979 A1 | 10/2016 |
| WO | 2015/184134 A1 | 12/2015 |
| WO | 2019/136207 A1 | 7/2019 |

OTHER PUBLICATIONS

Moscoso et al., A D-Alanine auxotrophic live vaccine is effective against lethal infection caused by *Staphylococcus aureus*. Virulence. Jan. 1, 2018;9(1):604-620.
Shahrooei et al., Vaccination with SesC decreases *Staphylococcus epidermidis* biofilm formation. Infect Immun. Oct. 2012;80(10):3660-8.
Wei et al., Alanine racemase is essential for the growth and interspecies competitiveness of *Streptococcus mutans*. Int J Oral Sci. Dec. 16, 2016;8(4):231-238.
Zhang et al., Inactivation of glutamate racemase (MurI) eliminates virulence in *Streptococcus mutans*. Microbiol Res. May-Jun. 2016;186-187:1-8.
International Search Report and Written Opinion for Application No. PCT/US2019/061439, dated Mar. 18, 2020, 14 pages.
Tan et al., *Staphylococcus epidermidis* ?Sortase A strain elicits protective immunity against *Staphylococcus aureus* infection. Antonie Van Leeuwenhoek. Jan. 2017;110(1):133-143.
Eilers et al., Dermatologic infections in cancer patients treated with epidermal growth factor receptor inhibitor therapy. J Natl Cancer Inst. Jan. 6, 2010;102(1):47-53.
Schmidt, Out of your skin. Nat Biotechnol. Apr. 2020;38(4):392-397.

*Primary Examiner* — Satyendra K Singh
(74) *Attorney, Agent, or Firm* — McCarter & English, LLP; Jonathan M. Sparks (57) ABSTRACT

The present disclosure provides recombinant *Staphylococcus* bacterium (e.g. *S. epidermidis*) that are dependent on D-alanine for growth. In one aspect, the disclosure features a recombinant *Staphylococcus* bacterium comprising two inactivated alanine racemase genes (Δalr1 Δalr2); and an inactivated D-alanine aminotransferase (dat) gene. In another aspect, the disclosure features a method of making the recombinant *Staphylococcus* bacterium. In another aspect, the disclosure features a method of treating or preventing a rash in a subject, comprising administering to the subject a population of the recombinant *Staphylococcus* bacterium of any one of the aspects or embodiments described herein, in an effective amount to treat or prevent the rash in the subject.

9 Claims, 3 Drawing Sheets
Specification includes a Sequence Listing.

AUXOTROPHIC STRAINS OF STAPHYLOCOCCUS BACTERIUM

CLAIM OF PRIORITY

This application is a continuation of International Patent Application No. PCT/US2019/061439, filed Nov. 14, 2019 which claims the benefit of U.S. Provisional Application Ser. No. 62/768,485, filed on Nov. 16, 2018. The entire contents of each of the aforementioned applications are hereby incorporated by reference.

BACKGROUND OF THE INVENTION

Alanine racemase is a pyridoxal phosphate-containing homodimeric enzyme that catalyzes the conversion of l-alanine to d-alanine, a key building block in the biosynthesis of the peptidoglycan layer in bacterial cell walls. Alanine racemases are typically absent in eukaryotes but ubiquitous among prokaryotes, which makes this enzyme an attractive target for the development of novel antimicrobials.

Although D-alanine is essential for bacterial cell wall formation, determining which genes are crucial in the D-alanine biosynthesis pathway has proven to be more complicated. Bacteria contain either one or two alanine racemase genes. In species with two genes, one is constitutively expressed and anabolic, while the other is inducible and catabolic (Strych, U. et al. 2007. BMC Microbiol. 7:40; Strych U. et al., Curr. Microbiol. 41:290-294; Strych U. et al., FEMS Microbiol. Lett. 196:93-98). These genes supply the D-alanine needed for cell wall biosynthesis, and knockout studies with several of these bacteria have established that the alanine racemase enzyme is essential for growth in the absence of exogenous D-alanine (Franklin, F. C., and W. A. Venables. 1976. Mol. Gen. Genet. 149:229-237; Hols, P., et al. J. Bacteriol. 179:3804-3807; Palumbo, E., et al. FEMS Microbiol. Lett. 233:131-138; Steen, A., et al. J. Bacteriol. 187:114-124; Wijsman, H. J. 1972. Genet. Res. 20:269-277).

Double alanine racemase genes knockout S. epidemidis strains (SEΔalr1Δalr2) were previously developed. However, the double knockout strains did not exhibit D-alanine auxotrophy in contrast to Bacillus subtilis, Escherichia coli and some other bacteria species.

The present disclosure therefore addresses the need for Staphylococcus bacterium that are dependent on D-alanine for growth.

SUMMARY OF THE INVENTION

The disclosure relates to recombinant Staphylococcus bacterium that are dependent on D-alanine for growth.

In one aspect, the disclosure features a recombinant Staphylococcus bacterium comprising two inactivated alanine racemase genes (Δalr1Δalr2); and an inactivated D-alanine aminotransferase (dat) gene. In one embodiment, the Staphylococcus bacterium is dependent on D-alanine for growth. In another embodiment, the Staphylococcus bacterium is Staphylococcus epidermidis (S. Epidermidis), and subspecies thereof. In one embodiment, the Staphylococcus bacterium further comprises one or more additional mutations.

In another aspect, the disclosure features a method of making a recombinant Staphylococcus bacterium comprising (i) transforming a plasmid comprising D-alanine aminotransferase (dat) knockout into competent cells of Staphylococcus strain (SEΔalr1Δalr2); (ii) detecting the presence of the knockout plasmid in transformed cells; (iii) incubating the transformed cells identified in step (ii); and (iv) purifying isolated colonies. In one embodiment, the method further comprises testing the isolated colonies for D-alanine auxotrophy. In another embodiment, the presence of knockout plasmid in transformants is detected using Polymerase Chain Reaction (PCR). In still another embodiment, recombinant Staphylococcus bacterium is Staphylococcus epidermidis (S. Epidermidis), and subspecies thereof. In one embodiment, the recombinant Staphylococcus bacterium is produced by the foregoing methods.

In another aspect, the disclosure features a kit comprising the recombinant Staphylococcus bacterium of any one of the aspects or embodiments described herein.

In another aspect, the disclosure features a method of treating or preventing a rash in a subject, comprising administering to the subject a population of the recombinant Staphylococcus bacterium of any one of the aspects or embodiments described herein, in an effective amount to treat or prevent the rash in the subject.

BRIEF DESCRIPTION OF THE DRAWINGS

FIGS. 2A and 2B show the results of PCR test of triple knockout strains (SEΔalr1Δalr2Δdat). Cells from patches on a plate of TSA+Anhydrotetracycline (2 µg/mL)+D-alanine (40 µg/mL) were used as template in PCR reactions: Clone #7; KO Clone #12; KO Clone #18; Wild type SE; SE1423KO plasmid DNA (Vector, as control). FIG. 2A: PCR was performed using primers 1423-5F and 1423-3R to distinguish wild type SE1423 locus (PCR product of 2.3 Kb) and SE1423 knockout (PCR product of 1.5 Kb). FIG. 2B: PCR was performed using primers 1423-F and 1423-R to detect a PCR product of 0.7 Kb, specific for the wild type SE1423 locus. As expected the PCR product was not generated from the SE1423 knockout plasmid and putative SE1423 knockout SE clones. Results confirmed successful SE1423 deletion in Clones #7, #12 and #18.

DETAILED DESCRIPTION OF THE INVENTION

I. Definitions

Unless defined otherwise, all technical and scientific terms used herein have the meaning commonly understood by a person skilled in the art to which this invention belongs. The following references provide one of skill with a general definition of many of the terms used in this invention: Singleton et al., Dictionary of Microbiology and Molecular Biology (2nd ed. 1994); The Cambridge Dictionary of Science and Technology (Walker ed., 1988); The Glossary of Genetics, 5th Ed., R. Rieger et al. (eds.), Springer Verlag (1991); and Hale & Marham, The Harper Collins Dictionary of Biology (1991). As used herein, the following terms have the meanings ascribed to them below, unless specified otherwise.

The articles "a" and "an" are used herein to refer to one or to more than one (i.e. to at least one) of the grammatical object of the article. By way of example, "an element" means one element or more than one element.

The term "including" is used herein to mean, and is used interchangeably with, the phrase "including but not limited to".

The term "or" is used herein to mean, and is used interchangeably with, the term "and/or," unless context clearly indicates otherwise.

The term "such as" is used herein to mean, and is used interchangeably, with the phrase "such as but not limited to".

As used herein, the term "auxotrophic" or "auxotrophy" refers to inability of an organism to synthesize a particular organic compound required for its growth. An auxotroph is an organism that displays this characteristic.

As used herein, the term "alrA" and "alr" refer to the D-alanine racemase gene, including normal alleles of the alrA gene.

As used herein, the term "dat" and "SE1423" refer to the D-alanine aminotransferase gene, including normal alleles of the dat gene.

As used herein, the terms "polypeptide" or "protein" refer to biological molecules, or macromolecules composed of amino-acid residues bonding together in a chain. The definition of polypeptides used herein is intended to encompass proteins (generally higher molecular weight) composed of one or more long chains of amino acid residues and small peptides (generally lower molecular weight) of a few amino acids. In other embodiments, a single amino acid, although not technically a polypeptide, is also considered within the scope of the invention.

The term "isolated" for the purposes of the present invention designates a biological material (cell, nucleic acid or protein) that has been removed from its original environment (the environment in which it is naturally present). For example, a polynucleotide present in the natural state in a plant or an animal is not isolated, however the same polynucleotide separated from the adjacent nucleic acids in which it is naturally present, is considered "isolated."

An "isolated nucleic acid molecule" (such as, for example, an isolated promoter) is one which is separated from other nucleic acid molecules which are present in the natural source of the nucleic acid. For example, with regard to genomic DNA, the term "isolated" includes nucleic acid molecules which are separated from the chromosome with which the genomic DNA is naturally associated. Preferably, an "isolated" nucleic acid molecule is free of sequences which naturally flank the nucleic acid molecule in the genomic DNA of the organism from which the nucleic acid molecule is derived.

As used here, the term "genetic element" is meant to refer to a polynucleotide comprising a region that encodes a polypeptide or a polynucleotide region that regulates replication, transcription or translation or other processes important to expression of the polypeptide in a host cell, or a polynucleotide comprising both a region that encodes a polypeptide and a region operably linked thereto that regulates expression. Genetic elements may be comprised within a vector that replicates as an episomal element; that is, as a molecule physically independent of the host cell genome. They may be comprised within plasmids. Genetic elements also may be comprised within a host cell genome; not in their natural state but, rather, following manipulation such as isolation, cloning and introduction into a host cell in the form of purified DNA or in a vector, among others.

As used herein, a "promoter" is meant to refer to a DNA sequence that directs the transcription of a structural gene. Typically, a promoter is located in the 5' region of a gene, proximal to the transcriptional start site of a structural gene. If a promoter is an inducible promoter, then the rate of transcription increases in response to an inducing agent. For example, a promoter may be regulated in a tissue-specific manner such that it is only active in transcribing the associated coding region in a specific tissue type(s).

As used herein, the term "host cell" is meant to refer to a cell which has been transformed or transfected, or is capable of transformation or transfection by an exogenous polynucleotide sequence.

As used herein, the term "polynucleotide(s)" generally refers to any polyribonucleotide or polydeoxyribonucleotide, which may be unmodified RNA or DNA or modified RNA or DNA. Thus, for instance, polynucleotides as used herein refers to, among others, single- and double-stranded DNA, DNA that is a mixture of single- and double-stranded regions or single-, double- and triple-stranded regions, single- and double-stranded RNA, and RNA that is mixture of single- and double-stranded regions, hybrid molecules comprising DNA and RNA that may be single-stranded or, more typically, double-stranded, or triple-stranded, or a mixture of single- and double-stranded regions. In addition, polynucleotide as used herein refers to triple-stranded regions comprising RNA or DNA or both RNA and DNA. The strands in such regions may be from the same molecule or from different molecules. The regions may include all of one or more of the molecules, but more typically involve only a region of some of the molecules. One of the molecules of a triple-helical region often is an oligonucleotide. As used herein, the term polynucleotide includes DNAs or RNAs as described above that contain one or more modified bases. Thus, DNAs or RNAs with backbones modified for stability or for other reasons are "polynucleotides" as that term is intended herein. Moreover, DNAs or RNAs comprising unusual bases, such as inosine, or modified bases, such as tritylated bases, to name just two examples, are polynucleotides as the term is used herein. It will be appreciated that a great variety of modifications have been made to DNA and RNA that serve many useful purposes known to those of skill in the art. The term polynucleotide as it is employed herein embraces such chemically, enzymatically or metabolically modified forms of polynucleotides, as well as the chemical forms of DNA and RNA characteristic of viruses and cells, including simple and complex cells, inter alia. The term polynucleotide also embraces short polynucleotides often referred to as oligonucleotide(s). "Polynucleotide" and "nucleic acid" are often used interchangeably herein.

As used herein, the term "radiation therapy" is meant to refer to a type of cancer treatment that uses beams of intense energy to kill cancer cells.

As used herein, the term "chemotherapy" is meant to refer to a type of cancer treatment that uses drugs to kill cancer cells.

As used herein, the term "rash" refers to any skin-related side effect of radiation therapy or chemotherapy. The rash is typically characterized by mild scaling, pimples, roughness, a feeling of tightness, and possibly itching and burning on the skin. This includes but is not limited to maculopapular rash (eczema-like spongiotic dermatitis), pruritus, lichenoid reactions, psoriasis, acneiform rashes, vitiligo-like lesions, autoimmune skin diseases (e.g., bullous pemphigoid, dermatomyositis, alopecia areata), sarcoidosis or nail and oral mucosal changes.

II. Compositions

The present disclosure describes a triple knockout *Staphylococcus* bacteria that is a D-alanine auxotroph. The present disclosure provides engineered *Staphylococcus* bacteria, such as for example, *Staphylococcus epidermidis*, that are genetically altered to have a double alanine racemase genes knockout and an alanine aminotransferase gene (dat, SE1423) knockout. The present disclosure provides triple knockout *S. epidermidis* strains (SEΔalr1Δalr2Δdat) that have the desired D-alanine auxotrophy.

D-Alanine is an essential component for bacteria with a peptidoglycan layer structure. The essentiality of D-alanine stems from the key role of the dipeptide D-alanyl-D-alanine in the cross-linking of peptidoglycan strands. As described in the present disclosure, double alanine racemase genes knockout *S. epidemidis* strains (SEΔalr1Δalr2) were previously developed. However, the double knockout strains did not exhibit D-alanine auxotrophy, in contrast to *Bacillus subtilis*, *Escherichia coli* and some other bacteria species. It was believed that the presence of glutamate racemase (interconverting L-glutamate and D-glutamate) and D-alanine aminotransferase (interconverting D-alanine and D-glutamate) in *S. epidermidis* could provide a bypass for alanine racemase. Therefore, the present disclosure provides a knockout of the alanine aminotransferase gene (dat, SE1423) in the double knockout strain (SEΔalr1Δalr2) that shows D-alanine auxotrophy.

The present disclosure provides bacterial host cells genetically engineered to have a deletion in a dat gene, or homolog thereof, such that the activity of D-alanine aminotransferase is reduced, thereby rendering the cell as a D-alanine auxotroph. In another embodiment, a bacterial cell is genetically engineered to comprise a deletion in another gene or operon, which influences the dat operon such that the activity of D-alanine aminotransferase is reduced, thereby rendering the cell as a D-alanine auxotroph.

Bacterial Strains

The present invention provides genetically altered microorganisms, e.g., bacteria. It is contemplated that the methods described herein can be carried out in any *Staphylococcus* bacteria cell, by inactivating or knocking out the gene encoding the protein homolog of dat in that cell, or by otherwise inactivating the expression or activity of this protein. Assignment of a strain to the genus *Staphylococcus* requires it to be a Gram-positive coccus that forms clusters, produces catalase, has an appropriate cell wall structure (including peptidoglycan type and teichoic acid presence) and G+C content of DNA in a range of 30-40 mol %. Examples include, but are not limited to, *S. aureus* group, including *S. argenteus*, *S. aureus*, *S. schweitzeri*, *S. simiae*; *S. auricularis* group, including *S. auricularis*; *S. carnosus* group, including *S. carnosus*, *S. condimenti*, *S. massiliensis*, *S. piscifermentans*, *S. simulans*; *S. epidermidis* group, including *S. capitis*, *S. caprae*, *S. epidermidis*, *S. saccharolyticus*; *S. haemolyticus* group, including *S. devriesei*, *S. haemolyticus*, *S. hominis*; *S. hyicus-intermedius* group, including *S. agnetis*, *S. chromogenes*, *S. felis*, *S. delphini*, *S. hyicus*, *S. intermedius*, *S. lutrae*, *S. microti*, *S. muscae*, *S. pseudintermedius*, *S. rostri*, *S. schleiferi*; *S. lugdunensis* group, including *S. lugdunensis*; *S. saprophyticus* group, including *S. arlettae*, *S. cohnii*, *S. equorum*, *S. gallinarum*, *S. kloosii*, *S. leei*, *S. nepalensis*, *S. saprophyticus*, *S. succinus*, *S. xylosus*; *S. sciuri* group, including *S. fleurettii*, *S. lentus*, *S. sciuri*, *S. stepanovicii*, *S. vitulinus*; *S. simulans* group; including *S. simulans*; *S. warneri* group; including *S. pasteuri*, *S. warneri*. In one embodiment, the *Staphylococcus* bacteria is *Staphylococcus epidermidis*.

Genetic Construct

The present invention utilizes standard molecular biology techniques, e.g., those described in (Sambrook et al. 2001). pJB38 (Boss et al., 2013) was used as plasmid backbone of the knockout vector, which is based on pJB38, an allelic exchange *E. coli*-staphylococcal shuttle vector, further comprising additional design features on the plasmid to improve functionality (Bose, J. L., et al. *Applied and environmental microbiology.* 2013; 79(7):2218-2224). Specific primers were designed for making SE1423 knockout (Table 1).

TABLE 1

| Primer | Sequence (5' to 3') | Application |
|---|---|---|
| 1423-5F (EcoRI) | atgcgaattcATGAGCGATACTTATTTGAATC | Amplification of 5' flanking region of SE1423 (0.5 Kb) |
| 1423-5R | ctatgcgattgaatatactttttcCTTAGCATCCTCTTCATTAAC | |
| 1423-3F | gttaatgaagaggatgctaaggaAAAGTATATTCAATCGCATAG | Amplification of 3' flanking region of SE1423 (1.0 Kb) |
| 1423-3R (SalI) | agctgtcgacAGCAGCATACCAATGTCAATC | |
| 1423-F | CATACGAAGATCGAGGCTAC | Amplification of a partial SE1423 (0.7 Kb) |
| 1423-R | GTACCAACTTGTCCGTCTTG | |
| JB-Cm-F | TTGATTTAGACAATTGGAAGAG | To amplify part of the chloramphenicol selection marker (0.7 Kb) in pJB38 |
| JB-Cm-R | AAGTACAGTCGGCATTATCTC | |

The plasmid is constructed by cloning overlapping PCR product at the EcoRI-SalI sites in pJB38 using Top10 *E. coli* as cloning host, using standard molecular biology techniques. Clones were selected and screened by PCR using primers 1423-5F and 1423-3R (Table 1) to detect the PCR product. A clone of correct SE1423 knockout plasmid (pJB-1423KO) was transformed into dam-/dcm- *E. coli* strain Gm2163. Plasmid DNA was isolated from two Gm2163 transformant clones by using Qiagen Midi Prep Kit and checked by restriction digestion with EcoRI and SalI, as above

Uses of Recombinant *Staphylococcus* Bacterium

The *Staphylococcus* bacterium of the invention can be used to as is, or modified to express a therapeutic polypeptide to treat disease. In one example, the *Staphylococcus* bacterium of the invention can be used to treat skin diseases or disorders. In another embodiment, the *Staphylococcus* bacterium of the invention can be modified to express a therapeutic polypeptide or fragment thereof to treat skin diseases or disorders.

Rash is one of the most common side effect of the use of cancer treatments such as radiation therapy or chemotherapy. Studies have shown that the use of chemotherapy drugs such as the epidermal growth factor receptor (EGFR) inhibitors, or immune checkpoint inhibitors lead to the manifestation of rashes in approximately 30-100% of the treated patients (Fabbrocini et al., Skin Appendage Disord. 2015, 1(1):31-7, and Sibaud et al., Am J Clin Dermatol. 2018, 19(3):345-361, incorporated herein by reference). Examples of EGFR inhibitors include, but are not limited to, monoclonal antibodies cetuximab (Erbitux®) and panitumumab (Vectibix®), and the small molecule tyrosine kinase inhibitors erlotinib (Tarceva®) and gefitinib (Iressa®). Examples of EGFR inhibitors include, but are not limited to, monoclonal antibodies targeting cytotoxic T lymphocyte-associated antigen-4 (CTLA-4), programmed cell death protein 1 (PD-1) or programmed death ligand 1 (PD-L1). The rash condition manifested by use of these drugs can affect the quality of life of these patients and can sometimes lead to a discontinuation of the therapy.

Accordingly, in one aspect, the disclosure features a method of treating or preventing a rash in a subject, comprising administering to the subject a population of the recombinant *Staphylococcus* bacterium of any one of the aspects or embodiments described herein, in an effective amount to treat or prevent the rash in the subject. According to one embodiment, the subject with rash is undergoing cancer treatment. According to one embodiment, the cancer treatment is radiation therapy. According to one embodiment, the cancer treatment is chemotherapy. According to one embodiment, the chemotherapy comprises epidermal growth factor inhibitors. According to one embodiment, the chemotherapy comprises checkpoint inhibitors.

Formulations

It will be further apparent that a formulation for use according to the present invention may comprise any pharmaceutically effective amount of a recombinant *Staphylococcus* bacterium, to produce a therapeutically effective amount of a desired polypeptide, for example, at least about 0.01%, about 0.05%, about 0.1%, about 0.2%, about 0.3%, about 0.4%, about 0.5%, about 0.6%, about 0.7%, about 0.8%, about 0.9%, about 1.0%, about. 1.5%, about 2.0%, about 3.0%, about 4.0%, about 5.0%, about 6.0%, about 7.0%, about 8.0%, about 9.0%, about 10.0%, about 11.0%, about 12.0%, about 13.0%, about 14.0%, about 15.0%, about 16.0%, about 17.0%, about 18.0%, about 19.0%, about 20.0%, about 25.0%, about 30.0%, about 35.0%, about 40.0%, about 45.0%, about 50.0% or more by weight of the genetically engineered microorganism, e.g., bacteria, the upper limit of which is about 90.0% by weight of the genetically engineered microorganism, e.g., bacteria.

In an alternative embodiment, the formulation for use according to the present invention can comprise, for example, at least about 0.01% to about 30%, about 0.01% to about 20%, about 0.01% to about 5%, about 0.1% to about 30%, about 0.1% to about 20%, about 0.1% to about 15%, about 0.1% to about 10%, about 0.1% to about 5%, about 0.2% to about 5%, about 0.3% to about 5%, about 0.4% to about 5%, about 0.5% to about 5%, about 1% to about 5%, or more by weight of a recombinant *Staphylococcus* bacterium.

III. Methods

The disclosure features methods of making a recombinant *Staphylococcus* bacterium comprising (i) transforming a plasmid comprising D-alanine aminotransferase (dat) knockout into competent cells of *Staphylococcus* strain (SEΔalr1Δalr2); (ii) detecting the presence of the knockout plasmid in transformed cells; (iii) incubating the transformed cells identified in step (ii); and (iv) purifying isolated colonies. In preferred embodiments, the presence of knockout plasmid in transformants is detected using Polymerase Chain Reaction (PCR). In certain embodiments, the method further comprises testing the isolated colonies for D-alanine auxotrophy.

IV. Kits

The present invention also provides kits. In one aspect, a kit of the invention comprises (a) a recombinant *Staphylococcus* bacterium of the invention and (b) instructions for use thereof. The compositions of the invention are described supra. In some embodiments, a composition of the invention comprises recombinant *Staphylococcus* bacterium is dependent on D-alanine for growth.

The present invention is further illustrated by the following examples, which should not be construed as further limiting. The contents of all figures and all references, patents and published patent applications cited throughout this application, as well as the Figures, are expressly incorporated herein by reference in their entirety.

EXAMPLES

The following examples further describe and demonstrate embodiments within the scope of the present invention. The Examples are given solely for purpose of illustration and are not to be construed as limitations of the present invention, as many variations thereof are possible without departing from the spirit and scope of the invention.

The invention describes in one embodiment the generation of a *Staphylococcus epidermidis* (*S. epidermidis*) expression system whereby expression plasmids can be maintained without the use of antibiotics. The present experiments document an extended effort to develop a D-alanine auxotroph *S. epidermidis* strain. Double alanine racemase genes knockout *S. epidermidis* strains (SEΔalr1Δalr2) were previously developed. However, the double knockout strains did not exhibit D-alanine auxotrophy in contrast to *Bacillus subtilis, Escherichia coli* and some other bacteria species. It was believed that the presence of glutamate racemase (interconverting L-glutamate and D-glutamate) and D-alanine aminotransferase (interconverting D-alanine and D-glutamate) in *S. epidermidis* could provide a bypass for alanine racemase, as reported in *S. aureus* and *Listeria monocytogenes*. Therefore, the present invention describes the knock of the alanine aminotransferase gene (dat, SE1423) in the double knockout strain (SEΔalr1Δalr2), to develop triple knockout *S. epidermidis* strains (SEΔalr1Δalr2Δdat) that exhibit D-alanine auxotrophy.

EXAMPLE 1: Vector for Deletion of SE1423 (D-alanine aminotransferase pJB38 (Boss et al., 2013) was used as plasmid backbone of the knockout vector. Specific primers were designed for making SE1423 knockout (Table 1).

TABLE 1

Primers for SE1423 Knockout

| Primer | Sequence (5' to 3') | Application |
|---|---|---|
| 1423-5F (EcoRI) | atgcgaattcATGAGCGATACTTATTTGAATC | Amplification of 5' flanking region of SE1423 (0.5 Kb) |
| 1423-5R | ctatgcgattgaatatacttttcCTTAGCATCCTCTTCATTAAC | |
| 1423-3F | gttaatgaagaggatgctaaggaAAAGTATATTCAATCGCATAG | Amplification of 3' flanking region of SE1423 (1.0 Kb) |
| 1423-3R (SalI) | agctgtcgacAGCAGCATACCAATGTCAATC | |
| 1423-F | CATACGAAGATCGAGGCTAC | Amplification of a partial SE1423 (0.7 Kb) |
| 1423-R | GTACCAACTTGTCCGTCTTG | |
| JB-Cm-F | TTGATTTAGACAATTGGAAGAG | To amplify part of the chloramphenicol selection marker (0.7 Kb) in pJB38 |
| JB-Cm-R | AAGTACAGTCGGCATTATCTC | |

Overlapping PCR using primers 1423-5F/1423-3R: 1.5 Kb
PCR product from wild type using primers 1423-5F/1423-3R: 2.3 Kb
F: forward primer
R: reverse primer
Added restriction sites for cloning are shown in underlined bold face letters PCR products of 5' and 3' flanking regions were generated, 0.5 Kb and 1.0 Kb, respectively. They were then used as templates in overlapping PCR to generate a large PCR product (1.5 Kb) that encompassed both the 5' and 3' flanking regions. The overlapping PCR product was cloned at the EcoRI-SalI sites in pJB38 using Top10 E. coli as cloning host. Clones were selected and screened by PCR using primers 1423-5F and 1423-3R to detect the PCR product of 1.5 Kb. Plasmid DNA was also isolated and digested by EcoRI and SalI to detect both fragments of the vector backbone (7.0 Kb) and the insert (1.5 Kb). A clone of correct SE1423 knockout plasmid (pJB-1423KO) was transformed into dam-/dcm- E. coli strain Gm2163. Plasmid DNA was isolated from two Gm2163 transformant clones by using Qiagen Midi Prep Kit and checked by restriction digestion with EcoRI and SalI, as above.

Example 2. Generation of Triple Knockout Strains (SEΔalr1Δalr2Δdat pJB-1423KO plasmid isolated from Gm2163 was transformed into competent cells of S. epidermidis strain (SEΔalr1Δalr2) using plates of TAS+chloramphenicol (10 µg/mL). The presence of the pJB-1423KO plasmid in transformants was confirmed by detecting the PCR product of 1.5 Kb using primers 1423-5F (EcoRI) and 1423-3R (SalI). In all 26 clones tested, PCR product of 1.5 Kb was observed, while a PCR product of 2.3 Kb was observed in a reaction containing cell lysate from the SE host cells. Cells of two confirmed clones were streaked on fresh plates of TSA+Cm (10 µg/mL)+D-alanine (40 µg/mL). Plates were incubated at 43° C. for 24 hr for plasmid integration via homologous recombination. Isolated colonies were streaked again for purification at 43° C. Four isolated colonies were inoculated into 50 mL TSB+D-alanine (40 µg/mL) in a 250-mL baffled shake flask in order to loop out the plasmid backbone via a second round of homologous recombination. The cultures were shaken at 30° C. for 24 hr. An aliquot of 0.5 mL culture was transferred to a flask containing 50 mL fresh medium. Transfer was repeated three times. Cells from the flask were plated on TSA+Anhydrotetracyclne (ATC 2 µg/mL)+D-alanine (DA, 40 µg/mL). After 2 days of incubation at 30° C., about 100-200 colonies were formed on plates plated with 100 µl of culture at $10^{-5}$ dilution. Further analyses of the colonies are described below.

Figure 1:
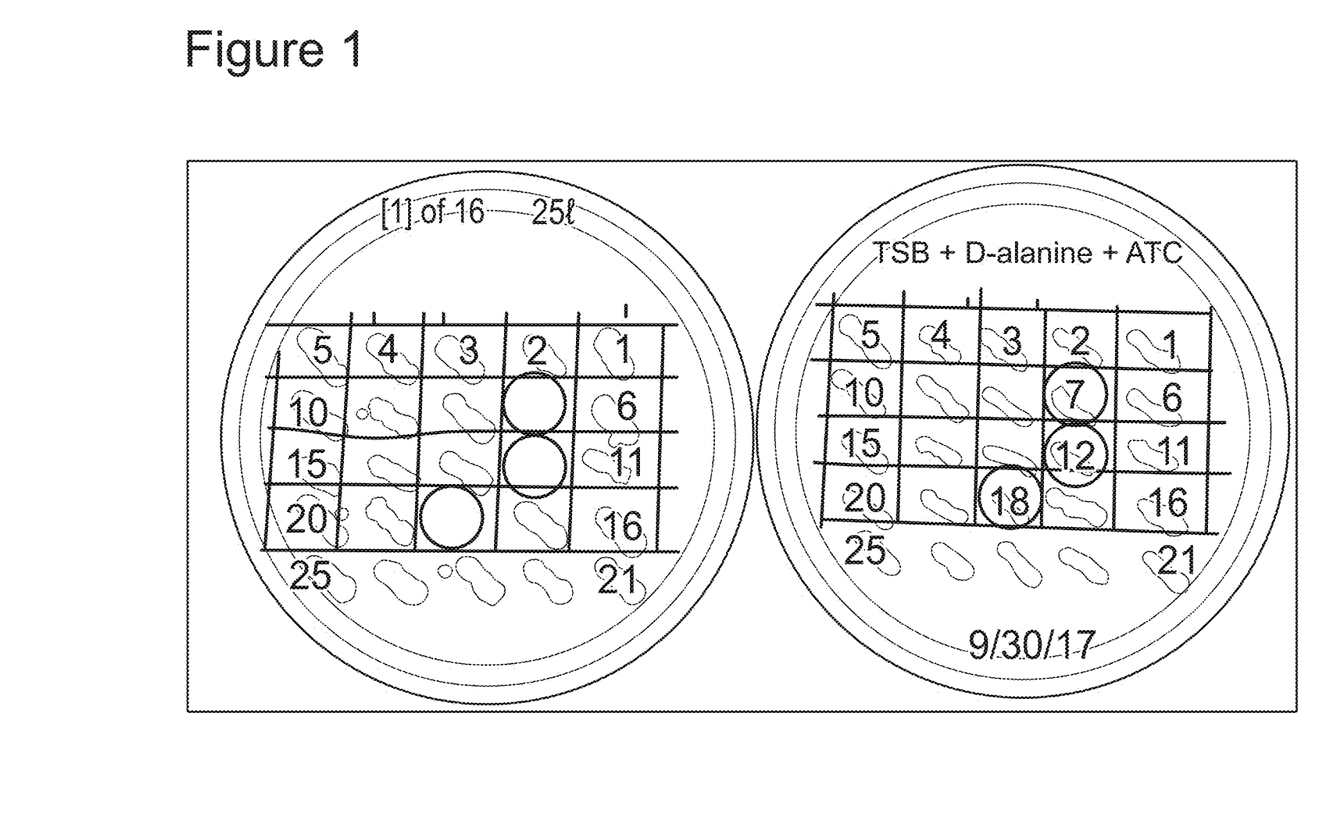
FIG. 1 shows the observation of D-alanine auxotrophy in S. epidermidis strains with triple genes knockout (SEΔalr1Δalr2Δdat). Following transformation with SE1423 knockout plasmid, plasmid integration and removal of the plasmid backbone, cells were plated for colonies. Twenty-five colonies were patched onto two different plates, and the plates were incubated at 30° C. overnight. Left: TSA plate; Right: TSA+Anhydrotetracycline (2 µg/mL)+D-alanine (40 µg/mL). Three clones (#7, #12 and #18, highlighted in red circle) could only grow on TSA supplemented with D-alanine.

Example 3. Test for D-Alanine Auxotrophy in the Triple Knockout Strains (SEΔalr1Δalr2Δdat A total of 25 isolated colonies from the TSA+ATC+DA plates were patched onto TAS plates and onto TAS+ATC+DA plates. Plates were incubated at 30° C. overnight. All clones grew well on the D-alanine supplemented plate (TSA+ATC+DA). As shown in FIG. 1, three clones (#7, #12 and #18) failed to grow on TSA without D-alanine supplementation, indicating D-alanine auxotrophy. The auxotrophic phenotype was observed again when cells from patches on the TSA+ATC+DA plate were patched again on TSA plates. Note that it was expected that some clones from the TSA+ATC+DA plates would retain the wild type SE1423 locus since the second round of homologous recombination could result in the removal of the plasmid backbone without knocking out SE1423.

Figure 2A:
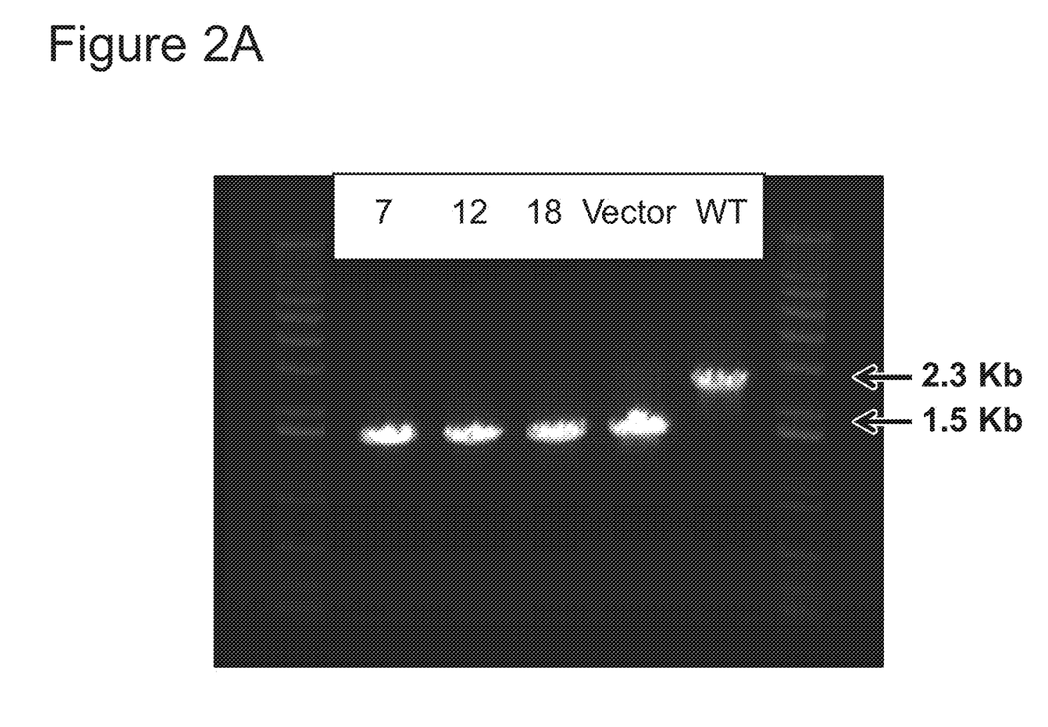
Figure 2B:
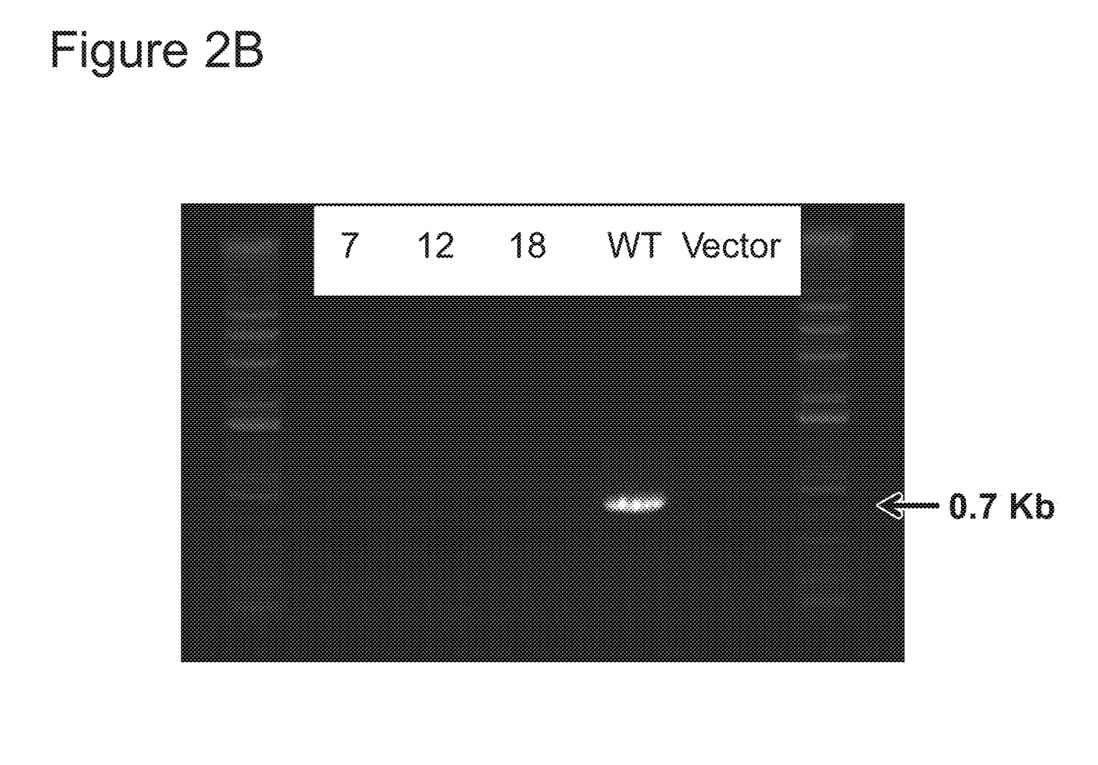

The clones that were D-alanine auxotrophs were further analyzed. When these 1423KO SE clones were patched onto TSA+Cm (10 µg/mL), they did not grow, indicating removal during the second round of homologous recombination of the plasmid backbone including the chloramphenicol selection marker. PCR using primers JB-Cm-F and JB-Cm-R (Table 1) also confirmed the loss of the antibiotic resistance marker (data not shown). PCR using primers 1423-5F and 1423-3R detected a PCR product of 1.5 Kb in these KO clones while the PCR product from the SE host was 2.3 Kb, as expected (FIG. 2A). Wild type SE cells produced a PCR product of 0.7 Kb using primers 1423-F and 1423-R (both specific to SE1423 coding sequence); this PCR product was not detected from the KO plasmid DNA and from the putative KO clones (FIG. 2B).

Therefore, based on all experimental data, it can be concluded that SE1423 (dat, D-alanine aminotransferase) was successfully deleted in the double alanine racemase genes knockout strain, generating a triple knockout S. epidermidis strain (SEΔalr1Δalr2Δdat). Moreover, the desired D-alanine auxotrophy was observed in the triple knockout strain.

D-alanine is required for the synthesis of bacterial cell peptidoglycan. It was enough to delete the alanine racemase gene(s) for D-alanine auxotrophy in B. subtilis and E. coli. However, in order to develop this phenotype in S. epidermidis, two alanine racemase genes (alr1, alr2) and the D-alanine aminotransferase gene dat (SE1423) must be knocked out. Evidently, the combination of glutamate racemase and D-alanine aminotransferase provides a viable bypass to alanine racemase, as reported in S. aureus MRSA132 (Moscoso et al., 2017) and Listeria monocytogenes (Thompson et al., 1998). Although the S. epidermidis genome contains a third putative alanine racemase homolog (SE1769), it is not necessary to knock out this gene for D-alanine auxotrophy under the experimental conditions used in this study.

With the successful development of a D-alanine auxotrophic S. epidermidis strain, the next step is to transform the strain using an expression vector that contains an alanine racemase gene as selection marker. Transformants will be selected by plasmid complementation of the D-alanine host auxotrophy.

EQUIVALENTS

Those skilled in the art will recognize, or be able to ascertain using no more than routine experimentation, many equivalents to the specific embodiments of the invention described herein. Such equivalents are intended to be encompassed by the following claims.

REFERENCES

Bose J L et al., 2013. Genetic tools to enhance the study of gene function and regulation in Staphylococcus aureus. Applied and Environmental Microbiology 79:2218-2224.

Moscoso M et al., 2017. Protective efficacy of a D-alanine auxotroph Staphylococcus aureus as a vaccine candidate against staphylococcal disease. 27th ECCMID, Apr. 22, 2017, Vienna, Austria.

Thompson R et al., 1998. Pathogenicity and immunogenicity of a Listeria monocytogenes strain that requires D-alanine for growth. Infection and Immunity 66:3552-3561.

Fabbrocini G et al., 2015. Acneiform Rash Induced by EGFR Inhibitors: Review of the Literature and New Insights, 1(1):31-7.

Sibaud V et al., 2018. Dermatologic Reactions to Immune Checkpoint Inhibitors: Skin Toxicities and Immunotherapy, 19(3):345-361.

What is claimed is:

1. A method of treating a rash in a subject, comprising administering to the subject a population of recombinant *Staphylococcus* bacterium, in an effective amount to treat the rash in the subject,
    wherein the recombinant *Staphylococcus* bacterium comprises two inactivated alanine racemase genes (Δalr1Δalr2); and an inactivated D-alanine aminotransferase (Δdat) gene,
    and wherein the *Staphylococcus* bacterium is *Staphylococcus epidermidis* (*S. epidermidis*), and subspecies thereof.

2. The method of claim 1, wherein the subject with rash is undergoing cancer treatment.

3. The method of claim 2, wherein the cancer treatment is radiation therapy.

4. The method of claim 2, wherein the cancer treatment is chemotherapy.

5. The method of claim 4, wherein the chemotherapy comprises epidermal growth factor inhibitors.

6. The method of claim 4, wherein the chemotherapy comprises checkpoint inhibitors.

7. The method of claim 1, wherein the *Staphylococcus* bacterium is dependent on D-alanine for growth.

8. The method of claim 1, wherein the *Staphylococcus* bacterium further comprises one or more additional mutations.

9. The method of claim 1, wherein the bacterium is transformed with an expression vector.

* * * * *

SEQUENCE LISTING

```
<160> NUMBER OF SEQ ID NOS: 8

<210> SEQ ID NO 1
<211> LENGTH: 32
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 1
atgcgaattc atgagcgata cttatttgaa tc                                    32

<210> SEQ ID NO 2
<211> LENGTH: 44
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 2
ctatgcgatt gaatatactt ttccttagca tcctcttcat taac                       44

<210> SEQ ID NO 3
<211> LENGTH: 44
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 3
gttaatgaag aggatgctaa ggaaaagtat attcaatcgc atag                       44

<210> SEQ ID NO 4
<211> LENGTH: 31
<212> TYPE: DNA
<213> ORGANISM: Artificial Sequence
<220> FEATURE:
<223> OTHER INFORMATION: Description of Artificial Sequence: Synthetic
```

-continued

```
        primer

<400> SEQUENCE: 4
agctgtcgac agcagcatac caatgtcaat c                                    31

<210> SEQ ID NO 5
<211> LENGTH: 20
<212> TYPE: DNA
<213> ORGANISM: Artificial Sequence
<220> FEATURE:
<223> OTHER INFORMATION: Description of Artificial Sequence: Synthetic
        primer

<400> SEQUENCE: 5
catacgaaga tcgaggctac                                                 20

<210> SEQ ID NO 6
<211> LENGTH: 20
<212> TYPE: DNA
<213> ORGANISM: Artificial Sequence
<220> FEATURE:
<223> OTHER INFORMATION: Description of Artificial Sequence: Synthetic
        primer

<400> SEQUENCE: 6
gtaccaactt gtccgtcttg                                                 20

<210> SEQ ID NO 7
<211> LENGTH: 22
<212> TYPE: DNA
<213> ORGANISM: Artificial Sequence
<220> FEATURE:
<223> OTHER INFORMATION: Description of Artificial Sequence: Synthetic
        primer

<400> SEQUENCE: 7
ttgatttaga caattggaag ag                                              22

<210> SEQ ID NO 8
<211> LENGTH: 21
<212> TYPE: DNA
<213> ORGANISM: Artificial Sequence
<220> FEATURE:
<223> OTHER INFORMATION: Description of Artificial Sequence: Synthetic
        primer

<400> SEQUENCE: 8
aagtacagtc ggcattatct c                                               21
```